United States Patent [19]

Edlund

[11] Patent Number: 4,911,455
[45] Date of Patent: Mar. 27, 1990

[54] SEALING RING STRUCTURE

[75] Inventor: Roy Edlund, Stuttgart, Fed. Rep. of Germany

[73] Assignee: Busak & Luyken GmbH & Co., Fed. Rep. of Germany

[21] Appl. No.: 272,149

[22] Filed: Nov. 16, 1988

[30] Foreign Application Priority Data

Nov. 19, 1987 [DE] Fed. Rep. of Germany ....... 3739179

[51] Int. Cl.$^4$ .......................... F16J 15/24; F16J 15/54
[52] U.S. Cl. ...................................... 277/165; 277/176
[58] Field of Search ......................... 277/165, 215, 176

[56] References Cited

U.S. PATENT DOCUMENTS

| 2,175,868 | 10/1939 | Bentley | 277/138 X |
| 3,109,661 | 11/1963 | Swaim et al. | 277/165 X |
| 3,132,869 | 5/1964 | Campbell | 277/171 |
| 3,506,275 | 4/1970 | Moriyama | 277/81 P |
| 3,751,047 | 8/1973 | McGee | 277/165 |
| 3,893,675 | 7/1975 | Geffroy | 277/165 X |
| 3,909,016 | 9/1975 | Traub et al. | 277/165 |
| 4,615,261 | 10/1986 | Meijer | 277/165 X |

Primary Examiner—Allan N. Shoap
Attorney, Agent, or Firm—Cohn, Powell & Hind

[57] ABSTRACT

A sealing ring structure comprising a sealing ring made of a tough-elastic plastic material and a stressing ring made of a rubber-elastic material has the outer surface of the sealing ring designed as a conical surface and arranged in such a manner, relative to a groove accommodating the sealing ring and the stressing ring, that the stressing ring comes to occupy a position between this conical surface and the flank of the groove on the low-pressure side. The pressure fluid, which penetrates to the outside of the sealing ring through pressure-relieving grooves, urges the stressing ring into the wedge-shaped gap between the outer surface of the sealing ring and the end face of the groove. Consequently, the sealing ring is wedged in the groove and prevented from rotating relative to the machine part comprising the groove and to the stressing ring.

8 Claims, 1 Drawing Sheet

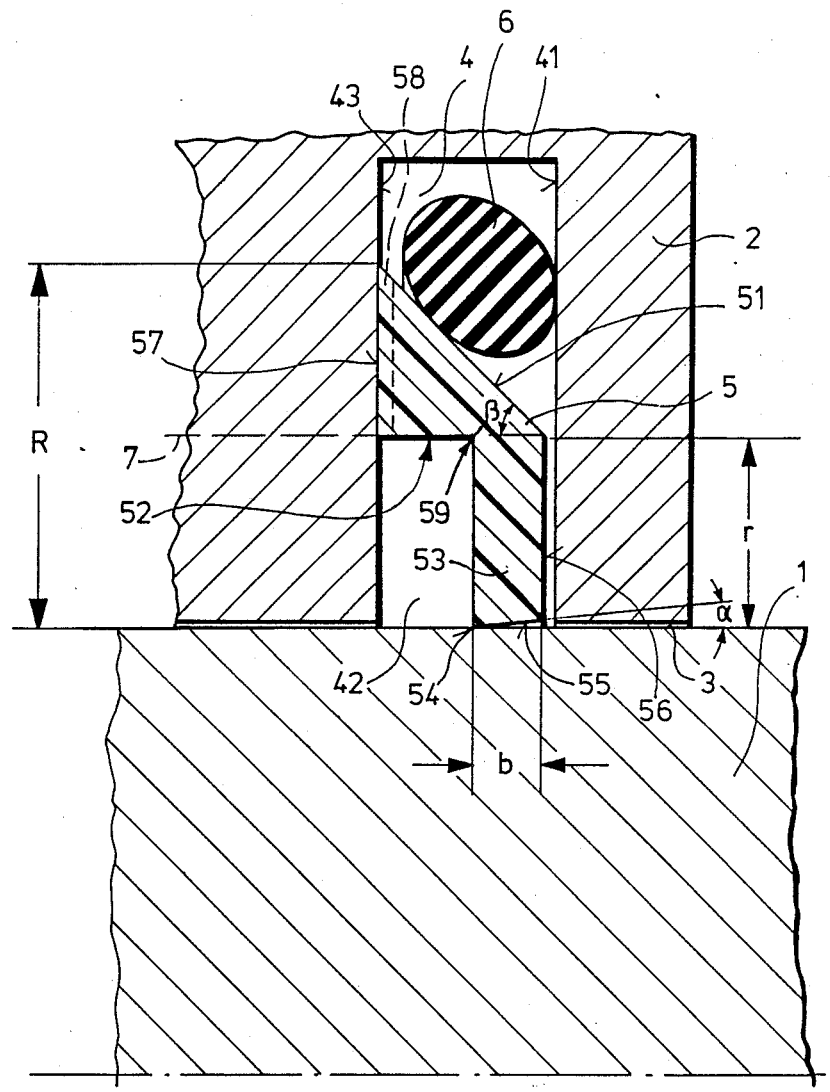

SEALING RING STRUCTURE

BACKGROUND OF THE INVENTION

The present invention relates to a structure for sealing the gap between two concentric machine parts which are arranged to move, in particular to rotate, relative to each other, the outer machine part being provided with a groove while the inner one comprises a plain contact surface arranged opposite the said groove, the sealing ring structure comprising a sealing ring made of a tough-elastic plastic material and fitted into the groove and being provided with a sealing edge bearing against the contact surface of the inner machine part, and a stressing ring made of a rubber-elastic material, which stressing ring surrounds the sealing ring, loads it radially at its outer surface and generates a pressure maximum at the sealing edge.

Sealing ring structures of this type have been known in many different forms. It is common to all of them that the stressing ring serves the function not only to influence the contact pressure prevailing at the sealing edge of the sealing ring, but also to seal the sealing ring relative to the groove in the outer machine part. The rubber-elastic stressing ring is sized for this purpose in such a manner that it is fixed in place between the cylindrical outer surface and the base of the groove which is arranged concentrically therewith.

It is a frequently encountered problem with these sealing structures that the sealing ring may get displaced, i.e. may rotate relative to the stressing ring. For example, an expansion due to temperature differences may cause the sealing ring to stick to the plain contact surface of the inner machine part, which situation may lead to a sliding movement between the sealing ring and the elastomeric stressing ring. However, such a condition leads very rapidly to overheating of the sliding surface between the two rings and, consequently, to failure of the seal because the frictional heat cannot be carried off with sufficient rapidity through the plastic material of the rings.

A sealing ring structure known from DE-OS No. 32 07 327 tries to prevent the two rings of the sealing ring structure from rotating relative to each other by the use of radial pins which are fixed in the outer stressing ring and engage radial bores in the inner sealing ring. It has been found, however, that the radial pins are not sufficient to absorb the forces generated by relative movements between the two rings but that, quite to the contrary, when the operating conditions give rise to relative movements between the two rings, the rings will be destroyed by the pins engaging them.

SUMMARY OF THE INVENTION

Now, it is the object of the present invention to improve a sealing ring structure of the type described above in such a manner that no relative rotation can occur between the sealing ring and the stressing ring.

This object is achieved according to the invention by the fact that the outer surface of the sealing ring is a conical surface, whose generating line forms with the axis of the arrangement an angle of between 30° and 60° and whose diameter increases from the low-pressure end towards the high-pressure end of the sealing ring, that the diameter of the groove is larger than the outer diameter of the stressing ring surrounding the sealing ring and the width of the groove is not substantially larger than the axial length of the sealing ring so that the stressing ring rests against one flank of the groove in sealing relationship and the sealing ring supports the axial pressure of the stressing ring at the other flank of the groove, and that the end face of the sealing ring at the high-pressure side is provided with pressure-relieving grooves.

In the case of the sealing ring structure according to the invention, therefore, the stressing ring is not arranged between the outer surface of the sealing ring and the base of the groove accommodating the rings, as in conventional arrangements, but rather in a wedge-shaped gap defined by the conical outer surface of the sealing ring and the flank on the low-pressure side of the groove accommodating the ring. In this manner, one achieves on the one hand a very strong frictional engagement between the conical surface of the sealing ring and the stressing ring which is pressed into the wedge-shaped gap through the fluid pressure, and on the other hand the sealing ring is deformed to a certain degree, i.e. tilted about the sealing edge adjacent the inner machine part, because its inner edge, being loaded by the fluid pressure, is urged against the flank of the groove on the low-pressure side while its outer edge is urged against the flank of the groove on the high-pressure side by the stressing ring which has been pressed into the wedge-shaped gap. Consequently, the sealing ring is prevented from rotating relative to the outer component and, accordingly, relative to the stressing ring not only by the friction between the stressing ring and the sealing ring, but also by the friction between the end faces of the sealing ring and the neighboring flanks of the groove accommodating the sealing ring. The sealing ring is, therefore, sort of braced in the groove of the larger component, whereby it is effectively prevented from rotating so that the relative movement between the sealing edge of the sealing ring and the inner machine part is maintained even in the presence of very unfavorable conditions. It is a particular advantage in this connection that the forces serving to fix the sealing ring in the groove are substantially directed in the axial sense which means that they do not load the sealing edge so that it is even possible, by proper selection of the stressing ring and of the shape of the sealing ring, to relieve the sealing edge in such a manner as to ensure that the admissible forces will not be exceeded, even at very high fluid pressures, and that at the same time a perfect sealing effect is guaranteed at all times. It will be appreciated without any difficulty that numerous different designs are possible for the cross-sections of the sealing ring and of the stressing ring of the sealing ring structure accoding to the invention. According to a preferred embodiment of the sealing ring, the sealing edge of the sealing ring is formed by the rim of a web arranged on the inside of the sealing ring, at its low-pressure end. The use of such a web leads to a relatively thin-walled sealing ring which exhibits the general shape of a disk with a bent-off rim and which, therefore, can be deformed with particular ease for the purpose of fixing it in the groove. The distance between the sealing edge and the end face of the sealing ring on the low-pressure side should be no more than half the axial length of the sealing ring, preferably equal to 0.4 times its axial length. Given the materials presently available, the thickness or axial length of the section of the sealing ring comprising the sealing edge should not exceed 0.5 mm. In addition it has been found to be convenient, for the same reason, if the radial extension of the end face of the sealing ring on the low-pressure side is equal to at least twice the distance between the sealing edge and the same end face.

It is regarded as a particular advantage that the sealing ring structure according to the invention does not require a special complex stressing ring but that the latter may consist of a normal O ring. The cord diameter of such an O ring should, preferably, be equal to 0.4 to 0.9 times the axial length of the sealing ring. Here again, a certain minimum thickness of the cord should be observed; presently, this minimum thickness is in the range of a diameter of 1.2 mm. Generally, the cord diameter of the sealing ring should be the smaller the greater the angle $\beta$ is selected between the generating line of the conical surface and the axis of the sealing ring structure.

It has been found that a particularly advantageous arrangement is achieved when the angle between the generating line of the outer surface of the sealing ring and the ring axis is in the range of approx. 45°.

As in the case of other sealing structures, in particular such for reciprocating movements, it is of advantage also for the sealing structure according to the invention if the angle included between that section of the inner surface of the sealing ring which extends from the sealing edge to the end face on the low-pressure side, and the contact surface on the inner machine part is in the range of maximally 10°. One obtains in this manner a clearly defined sealing edge, and the two surfaces form between them a wedge-shaped gap opening towards the low-pressure side and providing a drag effect in the reverse sense in case the machine parts which are sealed against each other should also perform a reciprocating movement relative to each other. Consequently, such an embodiment of the invention is particularly well suited for cases where the parts to be sealed against each other perform a combined rotary and linear movement.

As has been described before, the reliability of the sealing ring structure according to the invention is due among other things to the fact that the sealing ring is practically wedged between the flanks of the groove in which it is received. The width of the groove, therefore, must not be considerably larger than the axial length of the sealing ring and should in any case not exceed the latter by more than 10%.

The invention will now be described and explained in more detail with reference to the embodiment illustrated in the drawing. The features that can be derived from the description and the drawing may be used in other embodiments of the invention either individually or in any combinations thereof.

BRIEF DESCRIPTION OF THE DRAWINGS.

The drawing shows a cross-section through a sealing ring structure according to the invention.

DESCRIPTION OF THE PREFERRED EMBODIMENT

The sealing ring structure shown in the drawing serves for sealing a shaft 1 against a housing wall 2. The housing wall 2 comprises a bore 3 which receives the shaft 1 and whose diameter is only little larger than the diameter of the shaft 1. The housing wall 2 is provided with an annular groove 4 opening towards the surface of the bore 3 and accommodating a sealing ring 5 and a stressing ring 6. The sealing ring 5 consists in the conventional manner of a tough-elastic material, in particular a plastic material based on polytetrafluor ethylene or polyurethane, whereas the stressing ring consists of a rubber-elastic material, i.e. in particular an elastomeric plastic material.

The sealing ring 5 comprises a conical outer surface 51 and a cylindrical inner surface 52 extending from the high-pressure end of the sealing ring to a web 53 arranged adjacent the low-pressure end face of the sealing ring and projecting radially inwardly so that its rim on the highpressure side forms the sealing edge by which the sealing ring bears against the periphery of the shaft 1. The inner surface 55 of the web rises from this sealing edge 54 relative to the periphery of the shaft 1 by a small angle equaling approximately 5°.

The generating lines of the conical outer surface 51 and the direction of the axis of the sealing ring structure as indicated by the broken line 7 in the drawing are inclined relative to each other at an angle of $\beta=45°$. The dimensions are selected in such a manner that the width b of the web 53 is smaller than the axial length of the sealing ring 5 and the radial extension r at the low-pressure end face 56 is approximately equal to the radial distance between the cylindrical inner surface 52 and the sealing edge 54 and approximately equal to half the radial extension R at the high-pressure end face 57, where the sealing ring 5 is provided with radial pressure-relieving grooves 58 through which the fluid to be sealed off can pass to the outside of the sealing ring 5.

The groove 4 receiving the sealing ring 5 has a width only little greater than the length of the sealing ring 5 so that the sealing ring is received therein with only little play. The depth of the groove 4 is, however, selected small enough to ensure that the stressing ring 6 bearing against the outside 51 of the sealing ring cannot contact the base of the groove 4. The stressing ring 6 is an O ring with a cord diameter smaller than the axial length of the sealing ring 5. And the diameter of the stressing ring 6 is selected in such a manner that the ring is biassed towards the outer surface 51 of the sealing ring 5 and tends at the same time, due to the conical shape of this surface, to apply itself also at a certain pre-stress upon the flank 41 of the groove on the low-pressure side.

The drawing shows the described sealing ring structure in the unloaded condition. Now, when the seal is subjected to the action of a fluid introduced at high pressure from the left side, the fluid will act upon the sealing ring not only in the space 42 surrounding the shaft 1, but will be permitted also to pass to the high-pressure side of the stressing ring 6, through the relieving grooves 51. These circumstanes lead to the condition that on the one hand the sealing ring 5 is applied upon the flank 41 of the groove 4 on the low-pressure end, in the area of its web 53, while on the other hand the sealing ring 6 is urged into the wedge-shaped shaped gap defined by the flank 41 of the groove on the low-pressure end and the wedge-shaped contact surface 51 of the sealing ring. The stressing ring, whose outside is loaded by the highly pressurized fluid, exerts upon the sealing ring not only a radially directed force, but also - through the conical contact surface 51 - an axial force which is directed towards the high-pressure side and which causes the sealing ring 5 to deform in a manner corresponding to sort of a tilting movement about the sealing edge 54, and to apply its end face 57 against the flank of the groove 4 on the highpressure side. During this action, the sealing ring is also deformed in the area of its weak point 59, i.e. the area beside the end of the cylindrical inner surface 52 adjacent the web 53, so that the end face 57 comes to apply itself flat against the flank of the groove 4. Accordingly, the sealing ring 5 is practically wedged in the groove 4 in such a manner that the frictional forces exerted by the shaft 1 upon the sealing ring 5 are safely prevented, even under extremely unfavorable operating conditions, from getting high enough to cause the shaft to entrain the sealing ring against the action of the frictional forces exerted upon the sealing ring by the stressing ring and the walls of the groove. Quite to the contrary, the sealing ring is fixed in the groove 4 of the housing wall 2 with such safety that it has not been possible heretofore to create artificial operating conditions unfavorable enough to result in a rotation of the sealing ring 5 with the resulting dreaded rapid destruction of the sealing ring structure.

The described sealing ring structure distinguishes itself further by excellent sealing properties and very long service life. This is due to the fact that by giving the width b of the web 53 in convenient proportion to the axial length of the sealing ring 5, the sealing edge can be unloaded very effectively so that the force acting upon the sealing edge 54 can be determined very exactly by giving the sealing ring and the stressing ring an appropriate design.

It is a remarkable feature of the invention that the rings of the sealing ring structure according to the invention may have relatively small cross-sections and that the latter are largely independent of the diameter of the shaft. For example, a sealing ring which differed from the shape illustrated in the drawing only insofar as its inner surface corresponding to the inner surface 52 in the drawing was designed as a conical surface extending in parallel to the conical outer surface 51, and which was intended for sealing a shaft having a diameter of 50 mm, had a width of only 2.8 mm and an outer diameter of only 61.5 mm. The web 53, with the sealing edge 54, had a width of only 1.2 mm. The spacing between the conical outer surface 51 and the parallel inner surface was 2 mm. The described sealing ring was arranged in a groove having a width of 3 mm and a diameter of 65.5 mm. The O ring serving the function of the stressing ring had an inner diameter of 58.4 mm and a cord diameter of 2.6 mm. As mentioned before, rings of equal cross-sections may be used for a large range of different diameters, and it is by no means necessary to vary the ring cross-section in proportion to the ring diameter, for example. The smallest dimensions presently achievable with a view to the materials and production processes available at this time are b=0.5 mm for the width of the web and 1.2 mm for the cord diameter of the O ring. It has also been mentioned before that the cross-sectional shapes of the sealing ring and the stressing ring can be varied in many different ways. The only really important factor for the action of the sealing structure according to the invention is seen in the fact that the stressing ring must act on a conical outer surface and must be capable of causing the sealing ring to perform a tilting movement about its sealing edge by which the sealing ring is practically wedged in the groove in which it is received. The cross-section of the sealing ring influences its torsional rigidity and, accordingly, its resistance to deformation by the forces transmitted by the stressing ring. It will easily be appreciated that the forces required for such deformations will be lower for thinner-walled sealing rings. If, therefore, fluids under relatively low pressures are to be sealed off, it might be convenient to give both the thickness b of the web and the thickness of the annular portion defined by the conical surface 51 the smallest possible dimensions. On the other hand, if fluids under very high pressures are to be sealed off, it might be convenient to design the inner surface of the sealing ring as a conical surface extending in parallel to the outer surface 51, so as to avoid the weak point 59, and even to let the conical inner surface start directly at the sealing edge 54. Furthermore, it is also possible by corresponding variation of the angle $\beta$ of the conical outer surface 51, to vary the relation between the radial and axial components of the forces transmitted by the stressing ring 6 so as to adapt them optimally to the conditions prevailing in the particular case.

We claim as our invention:

1. Sealing ring structure for sealing the gap between two concentric machine parts aligned about a central, longitudinal axis and which parts are arranged to move relative to each other, the outer machine part being provided with a groove having opposed side walls connected by a bottom wall while the inner machine part comprises a plain contact surface arranged opposite the said groove, the sealing ring structure comprising a sealing ring made of a tough-elastic plastic material and fitted into the groove and being provided with a sealing edge bearing against the contact surface of the inner machine part, and a stressing ring made of a rubber-elastic material, which stressing ring surrounds the sealing ring, loads it radially at its outer surface and generates a pressure maximum at the sealing edge, the improvement comprising a sealing ring having a high pressure side, a low pressure side and an outer surface disposed between said sides and the outer surface of the sealing ring being a conical surface, whose generating line forms with said axis an angle ($\beta$) of between 30° and 60° and whose diameter increases from the low-pressure side towards the high-pressure side of the sealing ring, that the diameter of the groove is larger than the outer diameter of the stressing ring surrounding the sealing ring and the width of the groove is not substantially larger than the axial length of the sealing ring so that the stressing ring rests against one side wall of the groove in sealing relationship and the sealing ring supports the axial pressure of the stressing ring at the outer side wall of the groove, said sealing ring having an end face at the high pressure side engaging one side wall and an end face at the low pressure side opposing the other side wall and that the end face of the sealingn ring at the high-pressure side is provided with pressure-relieving grooves.

2. Sealing ring structure according to claim 1, in which a web is provided on the inside of the low-pressure end of the sealing ring, said web having a rim on the high pressure side thereof, and said sealing edge being formed by said rim.

3. Sealing ring structure according to claim 1, in which the distance (b) between the sealing edge and the end face of the sealing ring on the low-pressure side is not greater than half the axial length of the sealing ring.

4. Sealing ring structure according to claim 1, in which the radial extension (r) of the end face of the sealing ring on the low-pressure side is equal to at leastr twice the distance (b) between the sealing edge and the same end face.

5. Sealing ring structure according to claim 1, in which the stressing ring consists of an O ring whose cord diameter is substantially equal to 0.4 to 0.9 times the axial length of the sealing ring.

6. Sealing ring structure according to claim 1, in which the angle (β) between the generating line of the outer surface of the sealing ring and the ring axis is in the range of approx. 45°.

7. Sealing ring structure according to claim 1, in which the angle (d) included between that section of the inner surface of the sealing ring which extends from the sealing edge to the end face on the low-pressure side, and the contact surface on the inner machine part is in the range at maximally 10°.

8. Sealing ring structure according to claim 1, in which the width of the groove is maximally by 10% larger than the axial length of the sealing ring.

* * * * *

UNITED STATES PATENT AND TRADEMARK OFFICE
Certificate

Patent No. 4,911,455                                        Patented: March 27, 1990

On petition requesting issuance of a certificate for correction of inventorship pursuant to 35 U.S.C. 256, it has been found that the above-identified patent, through error and without any deceptive intent, improperly sets forth the inventorship. Accordingly, it is hereby certified that the correct inventorship of this patent is:
Roy Edlund and Wolfgang Bohler Signed and Sealed this Twenthy-seventh Day of November, 1990

WILLIAM A. CUCHLINSKI, Jr.

*Supervisory Patent Examiner*
*Patent Examining Art Unit 246*